July 4, 1950

R. C. HEFFERNAN 2,513,867

RETRACTABLE AIR BRAKE

Filed July 21, 1948

INVENTOR.

BY Robert C. Heffernan

M. B. Tasker

ATTORNEY

July 4, 1950
R. C. HEFFERNAN
2,513,867
RETRACTABLE AIR BRAKE
Filed July 21, 1948
4 Sheets-Sheet 2
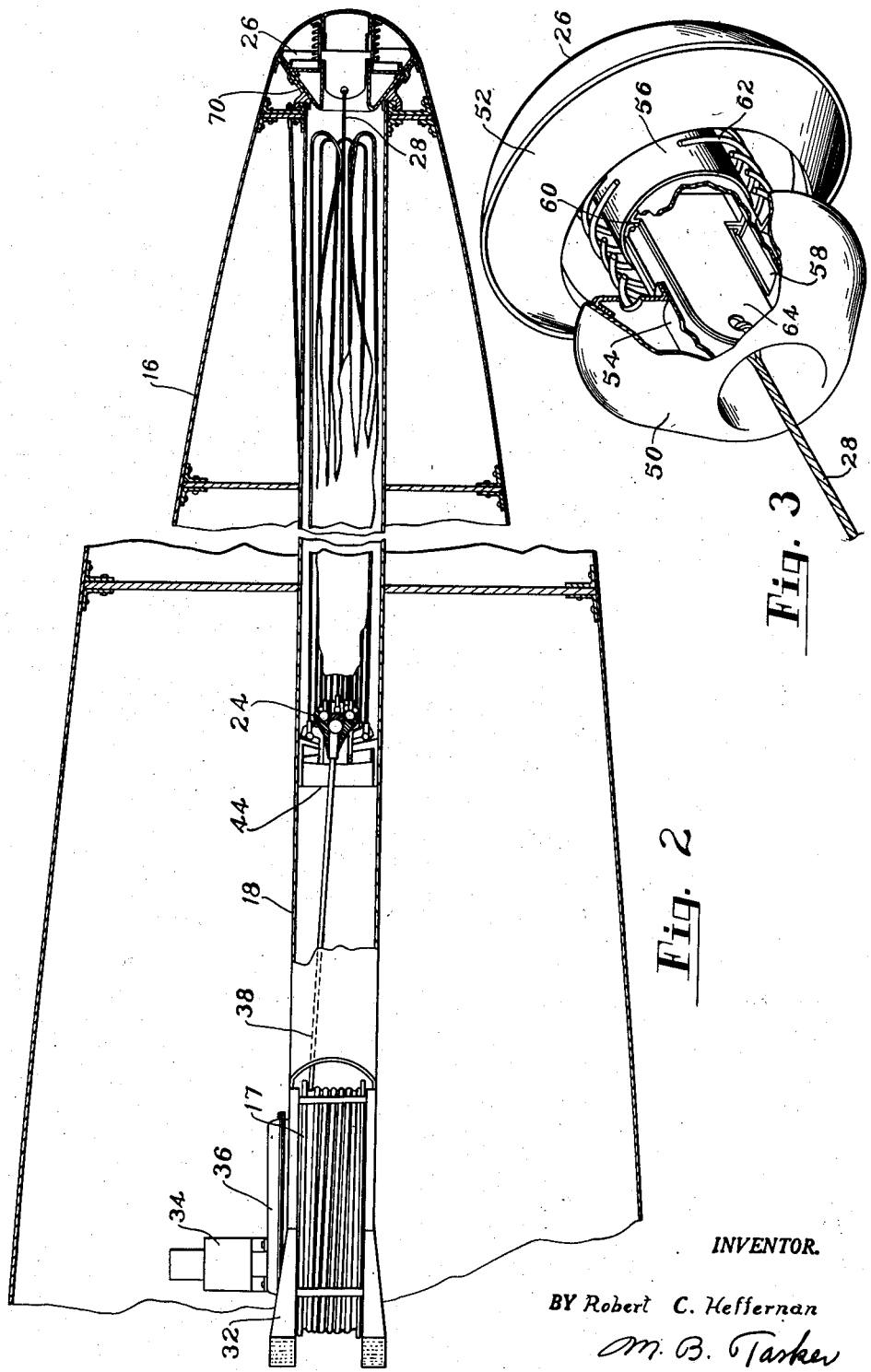
INVENTOR.
BY Robert C. Heffernan
M. B. Tasker
ATTORNEY July 4, 1950  R. C. HEFFERNAN  2,513,867
RETRACTABLE AIR BRAKE
Filed July 21, 1948  4 Sheets-Sheet 3

INVENTOR.
BY Robert C. Heffernan
M. B. Tasker
ATTORNEY

July 4, 1950 R. C. HEFFERNAN 2,513,867
RETRACTABLE AIR BRAKE
Filed July 21, 1948 4 Sheets-Sheet 4

INVENTOR.
BY Robert C. Heffernan
M. B. Tasker
ATTORNEY

Patented July 4, 1950

2,513,867

UNITED STATES PATENT OFFICE 2,513,867

RETRACTABLE AIR BRAKE

Robert C. Heffernan, St. Albans, N. Y., assignor to United Aircraft Corporation, East Hartford, Conn., a corporation of Delaware Application July 21, 1948, Serial No. 39,983

12 Claims. (Cl. 244—113)

This invention relates to improvements in speed retarding mechanisms of the parachute type for aircraft and has particular reference to an airbrake which is both retractable and jettisonable.

It is an object of this invention to provide a speed retarding device for high performance aircraft by extending a parachute from the airplane, the parachute being retractable at the will of the pilot.

It is a further object of this invention to provide a parachute type airbrake which can be extended and retracted and also can be jettisoned by the pilot.

A still further object of this invention is to provide an improved and simplified mechanism which permits extension and retraction of a parachute type airbrake and also permits instantaneous release of the parachute from the airplane.

These and other objects of the invention will become readily apparent from the following detailed description of the drawings which indicate one embodiment of this novel concept.

In these drawings:

Fig. 2 is a longitudinal sectional view of the tail cone section of an airplane showing the airbrake mechanism with the parachute in the stowed position;

Fig. 3 is a perspective view of the pilot chute in an operative extended position, portions of the chute being broken away to indicate internal structure;

Figure 1:
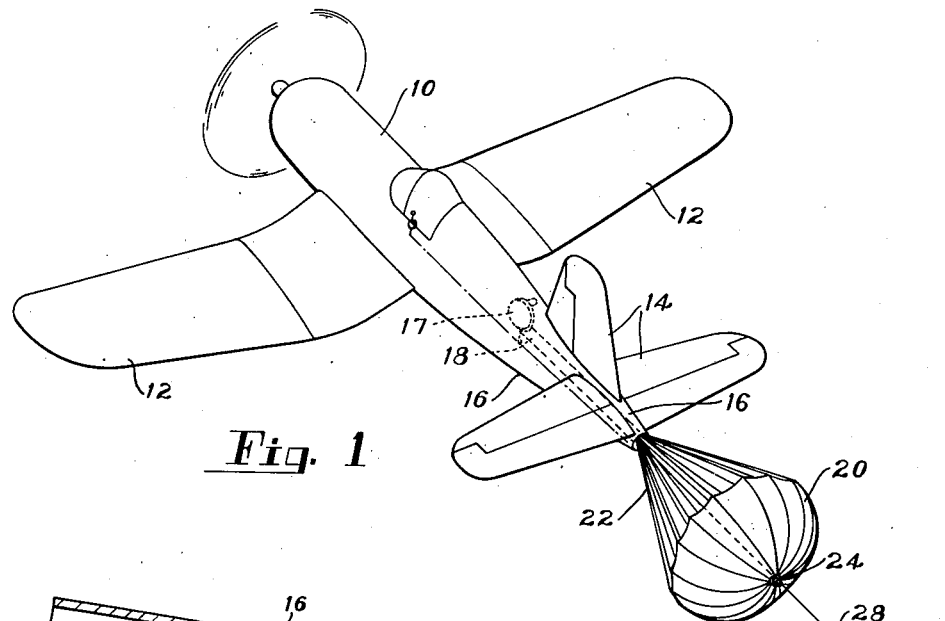
Fig. 1 is a perspective view of an airplane with the parachute type airbrake in the extended or operative position.

Referring to Fig. 1, the airbrake mechanism is usually utilized on a conventional airplane having a fuselage 10, wing surfaces 12 and an empennage 14. The parachute airbrake mechanism is mounted preferably in the tail cone section 16 of the airplane and consists of a winch or drum 17 which controls a cable passing through a tube 18, the tube being horizontally disposed along the longitudinal axis of the airplane. The drum 17 and the cable control the extension and retraction of the parachute assembly which consists of a canopy 20, cable type shroud lines 22, an apex fitting 24, and a pilot chute 26. The pilot chute 26 is spaced apart from the apex fitting 24 and attached thereto by an extension cable 28.

The parachute with its attaching fittings is normally housed inside out in the tube 18, as is more clearly seen in Fig. 2. The drum 17 is mounted on the aircraft structure slightly forward and in line with the tube 18 by the bracket 32. The drum 17 is actuated by a reversible electric motor 34 through a gear mechanism within the housing 36, the direction of rotation of the motor being controlled by a cockpit switch (not shown). The cable 38 has its forward end attached to the drum 17 and its aft end rotatably connected to the parachute apex fitting 24. The extension cable 28 connects the pilot chute 26 to the apex fitting 24 and as seen in Fig. 2 the pilot chute in its retracted position forms a streamline closure at the rear of the tail cone 16. While the apex fitting 24 receives the parachute shroud lines at the top of the canopy, the other ends of the shroud lines are held by the shroud carrier assembly 44 which is slidably mounted in the tube 18.

The pilot chute (Fig. 3) differs somewhat from the ordinary or conventional pilot chutes in that it consists of a separable frustro-conical assembly consisting of fore and aft sections 50 and 52, respectively. Each of these sections 50 and 52 have integral tubes 54 and 56 which are concentric and slidably mounted so as to telescope within each other. Relative movement between the sections 50 and 52 is limited by means of the slots 58 in the tube 54 and the cooperating tongue guides 60 on the tube 56. A coil spring 62 normally biases the sections 50 and 52 of the pilot chute 26 apart. A cable attaching plate 64, which is rigidly connected to the tube 56 of the aft section 52, is provided for connecting the pilot chute to the cable 28 and in turn to the apex fitting 24.

Figure 5:
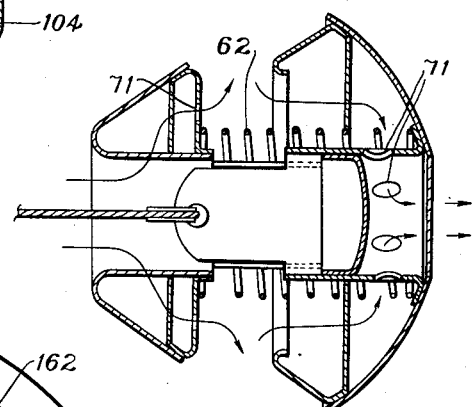
Fig. 5 is a cross sectional side elevation of the pilot chute and indicates the air flow therethrough.

In its stowed position the pilot chute 26 is in a closed inoperative position in the tail cone of the airplane. When the cable 28 is fully drawn into the tube 18 the forward section 50 of the pilot chute abuts a concave stop member 70, which forms a closure between the aft end of tube 18 and the tail cone 16. At the same time the aft section 52 is brought up flush with the forward section 50 against the pressure of the spring 62. In order to prevent gyrations and oscillations of the pilot chute when in its extended position, a plurality of vent holes 71 are provided. The path of the air flow is shown by the arrows in Fig. 5.

Figure 4:
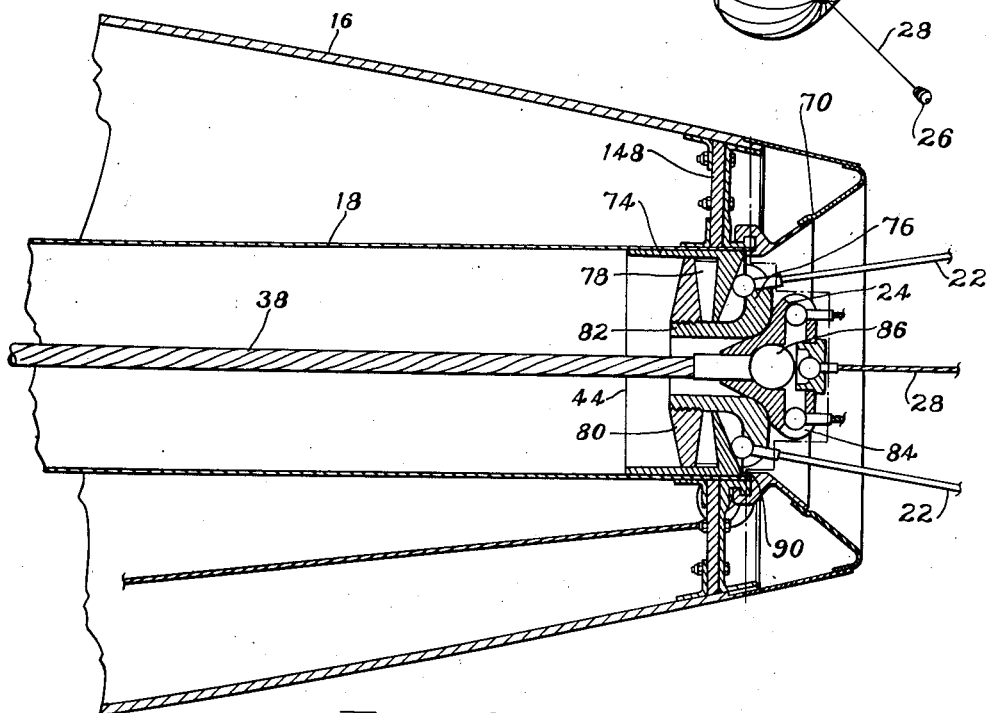
Fig. 4 is a cross sectional side view of the tail cone portion of the airplane showing the detailed structure of the parachute attaching fittings and indicating the engaged position of these fittings during retraction of the parachute.

As shown more clearly in Fig. 4, the apex fitting 24 is connected directly to the cable 38 which is operated by the drum 17 and is also connected to the pilot chute by the cable 28 so that the parachute can be extended and retracted with its apex first. Therefore, it is readily apparent that the apex fitting 24 has as its primary purpose the control connection for extension and retraction of the parachute and bears only the normal loads of these operations when it is withdrawn by the pilot chute or retracted by the cable 38.

The major air loads during braking are absorbed by the shroud carrier assembly 44 consisting of an annular guide member 74 and a shroud attaching member 76 which has a swivel connection with the guide member 74 by means of roller bearings 78 and a locking disk 80 which is threaded to a forwardly disposed cylindrical portion 82 on the shroud attaching member 76.

It should be noted at this point that the shroud lines 22 are connected to the shroud attaching member 76 by means of raceways which receive the ball swaged fittings at the ends of the shroud cables. Similar fittings are provided at the apex fitting 24. However, the slots 84 in the apex fitting 24 permit these swaged ball fittings to rotate sufficiently when the apex of the parachute is drawn inwardly or extended. The apex fitting 24 in addition can rotate in relation to the main cable 38 since the latter has a ball swivel connection 86 with the apex fitting 24. The shroud attaching member 76 can also rotate in relation to the guide member 74 by means of the roller bearing 78. It is therefore obvious that the shroud lines will not become entangled at any time since the entire parachute is able to rotate.

The guide member 74 of the shroud carrier assembly is limited in its aft movement by the annular flange 90 of the closure member 70 which protrudes within the aft end of the longitudinal tube 18. The closure member 70 is releasably attached to the tube 18 or a bulkhead so as to permit jettisoning of the shroud carrier assembly and parachute. The operation of the release mechanism will be described hereinafter.

Figure 6:
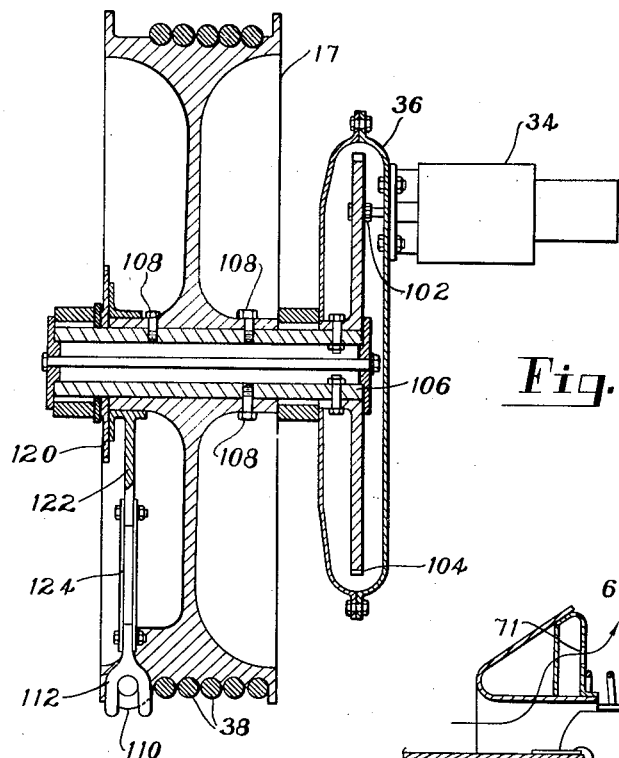
Fig. 6 is a cross sectional rear elevation of the cable drum and operating mechanism which is used for extending and retracting the parachute.

As mentioned previously, the drum 17 is operated by reversible electric motor 34 through a pinion gear 102 (Fig. 6), which in turn drives the spur gear 104, the latter being rigidly attached to the drive shaft 106. The drum 17 is also rigidly secured to the shaft 106 by means of bolts 108. The cable 38 is normally wound around the drum 17 and is releasably attached to the drum by means of a swaged ball fitting 110 which engages a bifurcated bracket 112.

Figure 7:
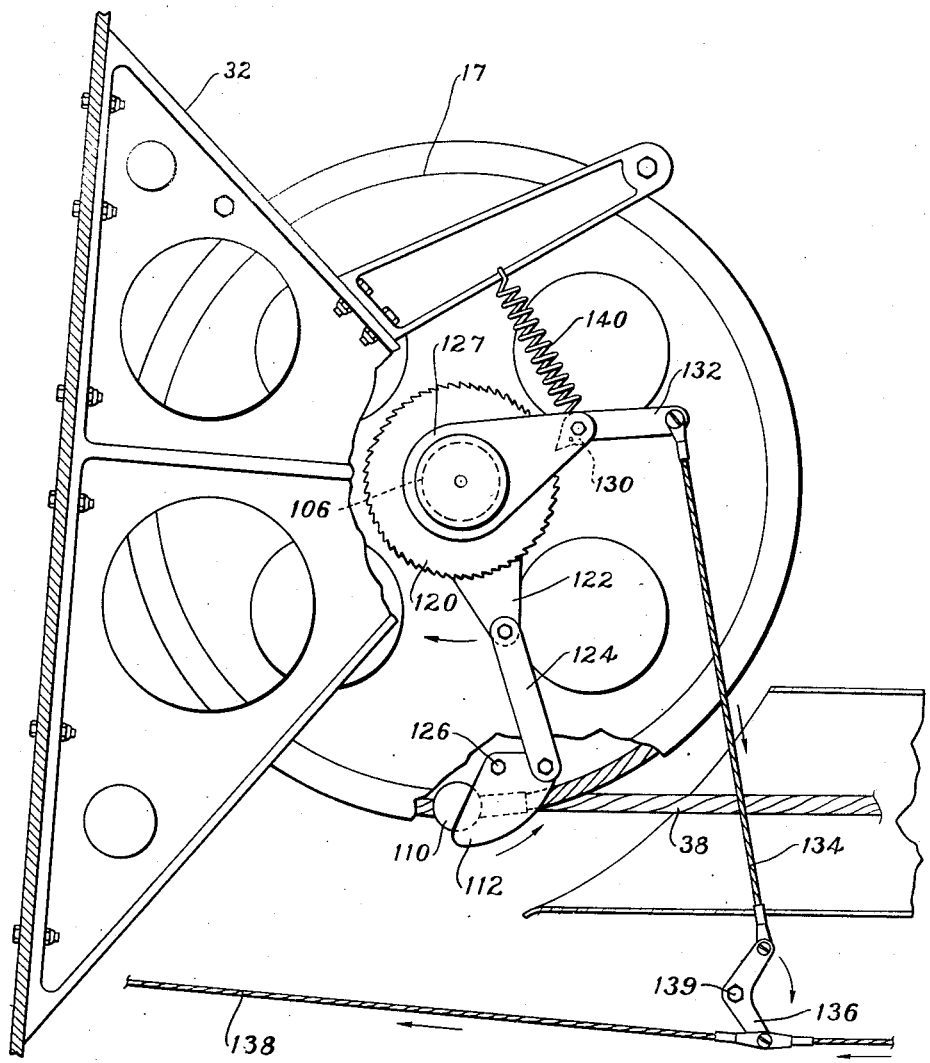
Fig. 7 is a side elevation of the parachute cable drum and indicates in detail the cable release mechanism.

As better seen in Fig. 7 the drum 17 and the shaft 106 are securely mounted on the aircraft structure by the bracket 32. The release mechanism for detaching the cable 38 from the drum 17 consists of a sprocket 120 which has a friction fit on the shaft 106 and carries an integral fixed plate 122. The sprocket 120 normally rotates with the shaft 106 and the drum 17 but it can forcibly be moved in relation to the shaft and the drum. The plate 122 is interconnected with the bifurcated bracket 112 by means of a toggled link 124. The bracket 112 is also pivotally connected at 126 to the drum 17. An arm 127 is rotatably mounted to the shaft 106 and has its free end pivotally connected to the pawl 130 and the link 132 which is fixed at one end to the pawl 130. The free end of the link 132 has a cable connection 134 with the bell crank 136. A pilot operated control cable 138 is connected to the other end of the bell crank 136 which has a pivot connection 139 with the airplane structure.

In order to disconnect the cable 38 from the drum 17, the pilot pulls the cable 138 to the left, as shown by the arrows in Fig. 7. This movement rotates the bell crank 136 clockwise which draws the cable 134 and the link 132 downwardly thereby causing the pawl 130 to rotate and move against the tension of the spring 140 and engage the teeth on the sprocket 120. Further movement of the pawl will tend to rotate the sprocket 120 on the shaft 106 and the integral plate 122 clockwise and at the same time cause the bifurcated bracket 112 to turn counterclockwise. The rotation of the bracket 112 causes the ball fitting 110 to be released from the drum.

Figure 8:
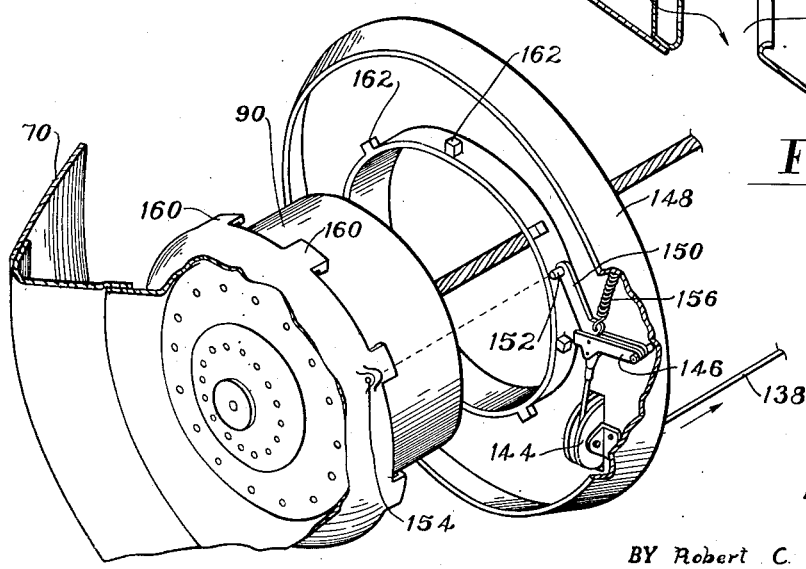
Fig. 8 is a detailed perspective view of the aft stop mechanism and indicates in detail the structure for releasing the stop mechanism from the airplane.

The pilot's release cable 138 is also connected through a pulley 144 (Fig. 8) to the pivot arm 146 on the bulkhead 148 in the rear part of the tail cone. The arm 146 has attached thereto a link 150 having an integral dowel 152 which engages a drilled passage in the lobe 154 on the closure member 70. A spring 156 normally holds the link 150 in a position that permits the engagement of a plurality of fingers 160 on the closure member 70 with corresponding lugs 162 on the bulkhead 148. It is then evident that when the pilot pulls the cable 138 to release the cable 38 from the drum 17 at the same time the link 150 in the aft end of the tail cone will be drawn downwardly thereby causing the closure member 70 to rotate and disengage the fingers 160 from the lugs 162 to permit the closure 70 to be released from the airplane structure.

Inasmuch as the closure 70 contains an annular flange 90 which acts as a stop for the shroud carrier assembly 44, the latter can leave the confines of the tube 18 and the airplane.

In operation, therefore, should the pilot wish to suddenly reduce the speed of the airplane he can operate a switch in the cockpit so that the motor 34 rotates the drum 17 to pay out the cable 38. Upon initial movement of the drum 17 and the cable 38, the tension on the aft section 52 of the pilot chute 26 will be released and the spring 62 within the pilot chute will cause the aft section to move outwardly away from the forward section 50 so that the air stream will flow into the after section and create a drag thereon. As the pilot chute is pulled out by the air pressure, the apex fitting 24 and the canopy 20 will also be withdrawn from within the tube 18. Once the apex fitting 24 is in the air stream the air loads on the parachute canopy 20 will cause the shroud carrier assembly to slide rearwardly in the tube 18 until the carrier reaches the annular flange stop 90 on the closure member 70. Therefore, when the parachute is fully extended the shroud carrier assembly will then bear the full drag load of the parachute and will tend to retard the speed of the airplane.

When the pilot wishes to retract the parachute he reverses the electric motor 34 which rotates the drum 17 and draws in the cable 38. This in turn causes the apex fitting 24 to retract, thereby turning the parachute inside out and tending to spill the air from the parachute canopy. When the apex fitting 24 reaches the position shown in Fig. 4, it engages the shroud attaching member 76 on the shroud carrier assembly 44 and draws the latter into the tube 18 until the parachute is retracted and the pilot chute is compressed in its closed position faired with the tail cone.

In the event that the pilot wishes to jettison the entire parachute assembly while in its extended position, he pulls the release cable 138 (Fig. 7) which causes the pawl 130 to engage the sprocket 120 and in turn rotate the bifurcated bracket 112 so as to release the ball fitting 110 at the forward end of the cable 38. At the same time (Fig. 8) the arm 146 and the link 150 will be moved against the tension of the spring 156 so as to rotate the closure member 70 and disengage the fingers 160 from the lugs 162 to release the entire rear closure 70 and its integral flange stop 90. Since in the extended position the shroud carrier 44 assembly will be abutting the stop 90, it will be pulled free of the airplane from within the tube 18 and the entire parachute will be jettisoned.

As a result of this invention it is evident that simple mechanism has been provided whereby the speed of high performance aircraft can be reduced considerably at the will of the pilot within a brief interim of time. Also, should the pilot find it desirable to continue normal flight after retarding the airplane by extending the parachute airbrake, he can readily retract the parachute and stow it within the airplane.

Further as a result of this invention, a parachute type of airbrake mechanism has been provided whereby the parachute can be jettisoned instantaneously should flight conditions demand such action.

Although only one embodiment of this invention has been shown and described herein, it will be evident that various modifications and changes can be made without departing from the scope of this novel concept.

What is desired by Letters Patent is:

1. In an aircraft, an airbrake comprising a parachute normally housed within said aircraft, a cable attached to said parachute, mechanism attached to the aircraft and operatively connected to said cable for extending and retracting the same, means including a spring-ejected pilot chute for initially moving said parachute from its normal position in the aircraft, and means for jettisoning said cable and parachute including elements cooperating with said mechanism.

2. In an aircraft, an airbrake comprising a parachute normally housed within said aircraft, a single cable attached to said parachute, reversible mechanism mounted on the aircraft and operatively connected to said cable for anchoring, extending and retracting said parachute, a pilot chute including spring-biased cooperating sections operatively connected to said cable and normally housed in said aircraft and adapted to initially move said parachute from its position in said aircraft when said pilot chute is ejected into the airstream, and pilot operated means for ejecting said pilot chute.

3. In an aircraft, an airbrake comprising a parachute normally housed within said aircraft, a cable attached to said parachute, reversible mechanism mounted on the aircraft and operatively connected to said cable for extending and retracting said parachute, a spring-loaded pilot chute operatively connected to said cable and normally housed in said aircraft and adapted to initially move said parachute from its position in said aircraft when said pilot chute is ejected into the airstream, pilot operated means for releasing said pilot chute from its normally housed position, and pilot operated means for releasing said cable and parachute from said mechanism.

4. In an airbrake mechanism for airplanes, a tube mounted longitudinally in the airplane, a parachute normally housed in said tube having shroud lines, an apex connection on said parachute, a winch operated cable fixed to said connection, a pilot chute spaced apart from said apex connection and attached thereto, a cylindrical shroud carrier slidably mounted in said tube and attached to said shroud lines, said winch operated cable controlling the extension and retraction of said pilot chute and parachute, means for imposing the air loads on said shroud carrier when said parachute is extended, and stops on said tube for limiting the aft movement of said carrier.

5. An airbrake mechanism according to claim 4 wherein said shroud carrier includes a swivel fitting for eliminating shroud entanglement due to spinning of the parachute in the extended position.

6. In an airplane airbrake mechanism, a tube mounted along the longitudinal axis of the airplane, a reversible windlass mounted forward of said tube and having a cable extended aft therefrom, a parachute housed in said tube having its apex attached to said cable, a pilot chute at the aft end of said tube, an extension of said cable connecting said apex to said pilot chute and normally maintaining said pilot chute in an inoperative position at the end of said tube, spring loading means for constantly urging said pilot chute rearwardly away from the end of said tube into the air stream, a cylindrical shroud carrier slidably mounted in said tube and having a central aperture for permitting said cable to pass therethrough to said apex, stop means detachably mounted to the aft end of said tube for limiting the aft movement of said shroud carrier, pilot operated means for extending and retracting said parachute by operation of said windlass, and means for jettisoning said parachute including a single control for releasing said cable connection at said windlass and disconnecting said stop means from said tube.

7. In an airplane, a retractable airbrake mechanism comprising a longitudinal tube terminating in the aft end of the airplane, a parachute normally housed in said tube, said parachute having an apex fitting and a shroud carrier, said shroud carrier having a central opening and being slidably mounted within said tube forward of said apex fitting, a reversible windlass mounted to said airplane and disposed forward of said tube, a cable releasably connecting said windlass to said apex fitting and passing through said central opening, a concave closure releasably attached to the aft end of said airplane and having an annular flange protruding within the end of said tube, said flange forming a stop for limiting the aft movement of said shroud carrier, a pilot chute spaced from said apex fitting and attached thereto, said pilot chute normally held against spring tension in an inoperative position by said windlass and adapted to be faired within said concave closure, and a single pilot operated control for jettisoning said parachute from an extended position including means for releasing said cable from said windlass and disabling said stop.

8. In a mechanism for jettisoning a retractable airbrake parachute for airplanes, a reversible windlass, a cable connecting the apex of said parachute to said windlass, said cable being detachably connected to said windlass by a ball fitting engaging a rotatable bifurcated bracket on said windlass, a longitudinal tube normally housing said parachute and having a parachute shroud carrier slidably mounted therein, stop means on the aft end of said tube for limiting the aft movement of said shroud carrier, said stop means comprising an annular flange protruding forward within the end of said tube and held in position by a plurality of spaced locking lugs on the outer periphery of said tube, and control means for detaching said cable from said windlass and said stop means from said tube including a single release mechanism for rotating said bifurcated bracket to disengage said fitting and for rotating said annular flange to disengage said locking lugs.

9. An airbrake mechanism for airplanes comprising a tube mounted longitudinally in the tail cone of the airplane and having its aft end terminating slightly forward of the trailing edge of said cone, a concave closure member releasably attached to the airplane and connecting the aft end of said tube with said trailing edge, said closure having an annular flange protruding within the end of said tube, a parachute normally housed in said tube, a cylindrical shroud carrier slidably mounted within said tube and having a swivel connection with the shroud lines of said parachute, said shroud carrier being limited in its aft movement by said annular flange, an apex fitting on said parachute, a windlass mounted forward of said tube, said windlass being driven by a reversible electric motor and carrying a releasable cable, said cable being connected to said apex fitting for permitting extension and retraction of said parachute apex first, a pilot chute spaced from and attached to said apex fitting, said pilot chute being normally stowed in an inoperative position abutting said closure member, a spring urging said pilot chute away from said closure member and tending to move said pilot chute into the air stream in response to unwinding of said cable from said windlass, and a pilot operated control for jettisoning said parachute and shroud carrier from the airplane including means for releasing said cable from said drum and said closure member from said airplane.

10. In a pilot chute mechanism for use with a retractable parachute airbrake for airplanes, a separable frustro-conical chute having fore and aft sections faired into the tail section of an airplane; said aft section having a central opening and said fore section normally abutting said aft section and forming a closure for said opening, said section being held in the aforesaid abutting position by a pilot operated retracting mechanism, and means for exposing said opening to the air stream to cause a drag on said aft section including resilient means for separating said sections responsive to release of said retracting mechanism.

11. In an airbrake mechanism for airplanes, a tube mounted longitudinally in the airplane, a parachute normally housed in said tube having shroud lines, an apex connection on said parachute, a winch operated cable fixed to said connection, a pilot chute spaced apart from said apex connection and attached thereto, a cylindrical shroud carrier slidably mounted in said tube and attached to said shroud lines, said winch operated cable controlling the extension and retraction of said pilot chute and parachute, and stop means on said tube for limiting the aft movement of said carrier.

12. In an airbrake mechanism for airplanes, a tube mounted longitudinally in the airplane, a parachute normally housed in said tube having shroud lines, an apex connection on said parachute, a winch operated cable fixed to said connection, a pilot chute spaced apart from said apex connection and attached thereto, a cylindrical shroud carrier slidably mounted in said tube and attached to said shroud lines, said winch operated cable controlling the extension and retraction of said pilot chute and parachute, means for imposing air loads on said shroud carrier when said parachute is extended, and means for transferring said loads from said carrier to the structure of said airplane.

ROBERT C. HEFFERNAN.

REFERENCES CITED

The following references are of record in the file of this patent:

UNITED STATES PATENTS

| Number | Name | Date |
|---|---|---|
| 1,793,870 | Rolker | Feb. 24, 1931 |
| 1,972,967 | Zahodiakin | Sept. 11, 1934 |
| 2,363,732 | Jenkins | Nov. 28, 1944 |

FOREIGN PATENTS

| Number | Country | Date |
|---|---|---|
| 815,858 | France | Apr. 19, 1937 |